United States Patent [19]

Nakamura et al.

[11] 4,172,107

[45] Oct. 23, 1979

[54] METHOD OF MANUFACTURING COMPOSITE CERAMIC ARTICLES

[75] Inventors: Kiyoshi Nakamura, Yokohama; Takashi Ishii, Tokyo; Michiyasu Komatsu, Yokohama; Tadashi Miyano, Sagamihara; Masae Nakanishi, Yokohama, all of Japan

[73] Assignee: Tokyo Shibaura Electric Co., Ltd., Kawasaki, Japan

[21] Appl. No.: 800,952

[22] Filed: May 26, 1977

Related U.S. Application Data

[62] Division of Ser. No. 740,084, Nov. 9, 1976.

[30] Foreign Application Priority Data

Nov. 10, 1975 [JP] Japan .................................. 50/133964
Nov. 10, 1975 [JP] Japan .................................. 50/133965

[51] Int. Cl.² .............................................. C04B 37/00
[52] U.S. Cl. ........................................ 264/58; 264/60; 264/320; 264/332; 264/DIG. 50
[58] Field of Search ......... 264/332, 320, 60, DIG. 50, 264/58

[56] References Cited

U.S. PATENT DOCUMENTS

| | | | |
|---|---|---|---|
| 3,776,744 | 12/1973 | Clendenen | 264/332 |
| 3,854,189 | 12/1974 | Ezis et al. | 423/344 |
| 3,885,294 | 5/1975 | Chaundy et al. | 423/344 |
| 3,886,254 | 5/1975 | Tanaka et al. | 264/332 |
| 3,887,411 | 6/1975 | Goodyear et al. | 156/89 |
| 3,887,412 | 6/1975 | Styhr et al. | 156/89 |
| 3,892,835 | 7/1975 | Holdsworth | 264/332 |
| 3,905,723 | 9/1975 | Torti | 416/241 |
| 3,989,438 | 11/1976 | Smith et al. | 264/332 |
| 4,011,295 | 3/1977 | Tree | 264/271 |
| 4,071,372 | 1/1978 | Bird | 106/73.5 |
| 4,075,276 | 2/1978 | Economy et al. | 264/332 |
| 4,087,500 | 5/1978 | Fisher et al. | 264/60 |

*Primary Examiner*—Harold D. Anderson
*Attorney, Agent, or Firm*—Cushman, Darby & Cushman

[57] ABSTRACT

Composite ceramic articles formed by integrally assembling a plurality of previously molded constituent members without applying an adhesive to their joints and designed to have a density higher than 98% of the theoretical value, and a flexural strength greater than 50 kg/cm² at 1200° C., and a method of producing ceramic articles of particularly complex shape which comprises the steps of previously molding a plurality of constituent members of complex shape and later integrally assembling said constituent members without applying an adhesive to their joints.

10 Claims, 9 Drawing Figures

METHOD OF MANUFACTURING COMPOSITE CERAMIC ARTICLES

This is a division, of application Ser. No. 740,084 filed Nov. 9, 1976.

BACKGROUND OF THE INVENTION

This invention relates to high density composite ceramic articles formed by integrally assembling two or more molded constituent members of prescribed shape and more particularly high density composite ceramic articles of particularly complex shape and a method of manufacturing the same.

A molding-sintering process is indispensable to the manufacture of ceramic articles. However, production of high density ceramics requires a long sintering time. The larger a ceramic product, the more extended is the required molding-sintering period. This process is generally accompanied with the drawbacks that the resultant product is subject to chipping or breakage, and moreover a large scale plant is required. Therefore, the process of molding and sintering a single large ceramic block is not always favorably accepted from the industrial point of view. A Japanese Pat. No. 42812, 1972, for example, sets forth a method of manufacturing high density ceramics by hot pressing a low density molding of complex shape in a powdery pressure-transmitting medium. The disclosured process, however, not only has the drawback that once chipping or breakage occurs in any portion of a product while being molded or sintered, the product is disqualified for commercial acceptance, but also is not well adapted for tonnage manufacture of large ceramics.

To avoid the above-mentioned difficulties, another method of previously molding two or more constituent members and finally integrally assembling them into a product has been proposed as an attempt to provide ceramics of relatively large size or complex shape by an industrially advantageous process.

For example, a Japanese patent disclosure No. 75910, 1974 which points out the difficulty of hot pressing ceramics of complex shape with great mechanical strength sets forth a method of producing, for example, a composite ceramic turbine rotor by fabricating the wing portions by casting, ordinary sintering and bonding reaction, separately hot pressing the hub portion and finally integrally assembling said wing portions and hub portion by refractory cement.

Generally, a turbine rotor is rotated at as high a speed of more than 60,000 r.p.m. and subjected to a tensile force acting in the circumferential as well as radial direction, and moreover thermal stress is present. While the turbine rotor is operated, the tips of the wing portions are heated to a temperature as high as 1100° to 1200° C. Therefore, the turbine rotor is required to have a sufficient mechanical strength to withstand such a high temperature.

However, according to the manufacturing method proposed by the aforesaid Japanese patent disclosure No. 75910, 1974, a turbine rotor has the joints bonded by refractory cement and is likely to cause irregularities to occur in the density of both blade portions and hub portion or in the whole structure failing to display high mechanical strength as expected.

DESCRIPTION OF THE INVENTION

The present invention has been accomplished in view of the above-mentioned circumstances and is intended to provide high density ceramics having great mechanical strength even at high temperature.

Another object of the invention is to provide a method of manufacturing a composite ceramic article having a substantially uniform density and structure throughout and great mechanical strength both at high temperature.

A high density composite ceramic article embodying this invention is characterized in that said article is a fully integrated body, has a uniform density greater than 98% of the theoretical value and a flexural strength greater than 50 kg/cm$^2$ at temperature of 1200° C., and no adhesive material is applied to the joints of the constituent members of said composite article.

Still another object of the present invention is to provide a high density composite ceramics-manufacturing method which comprises the steps of molding raw ceramic powder into a plurality of constituent members having a prescribed shape; preliminarily sintering the moldings to a density greater than 65% of the theoretical value; assembling the preliminarily sintered moldings into a block of predetermined shape; and hot pressing said block to a higher density greater than the 98% of the theoretical value.

BRIEF DESCRIPTION OF THE DRAWINGS

This invention can be more fully understood from the following detailed description when taken in conjunction with the accompanying drawings, in which.

DETAILED DESCRIPTION OF THE INVENTION

Figure 1:
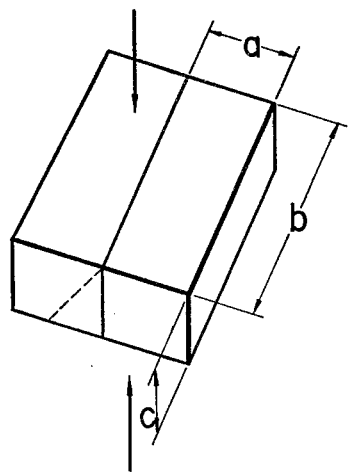
FIGS. 1 to 4 are oblique views of composite samples used in a compounding experiment.

A composite ceramic article provided by the method of this invention has the following characteristics:

(1) The article is an integral assembly of constituent ceramic members of particularly complicated shape;

(2) The composite block has a uniform density having a density greater than 98% of the theoretical value;

(3) The product has a flexural strength greater than 50 kg/cm$^2$ at temperature of 1200° C.;

(4) No foreign matter, for example, an adhesive, is applied to the joints; and (5) The article is well suited for use as particularly a turbine rotor which is required to have great mechanical strength at high temperature.

The term "complex shaped" as applied to a shape body in accordance with this invention, denotes a body whose cross-sections vary markedly and/or irregularly as successive horizontal planes are passed through the body in a direction perpendicular to the application of the unidirectional pressure in a press for carrying out the method of this invention, for example, a body having a three dimensionally curved plane. The term "uniform density" denotes the density of the respective constituent members of a composite ceramic article in which variations fall within the range of variation of ±5%. The term "integral assembly" represents a compounded block in which the joints of the constituent members have a mechanical strength equal to or greater than the other portions of said constituent members.

Ceramic material of a composite ceramic article according to this invention which is used in such applications as require a great mechanical strength at high temperature consisting mainly of oxide ceramics is not preferred. For practical reasons, the subject composite ceramic article should exclusively be formed of such material as consists mainly of nitrides such as silicon nitride and aluminium nitride, or carbides, for example, silicon carbide. Further, other additives or impurities may be incorporated with the raw ceramic material depending on the application to which a final composite ceramic article is put. In all cases, the product should contain at least 50% by weight, or preferably more than 70% of ceramic material. Where the raw ceramic powder consists of silicon nitride, it is desired to add less than 30% by weight of yttria and less than 5% of alumina in order to elevate the mechanical strength of a product. The other additives such as MgO, BeO, $SiO_2$, CaO, oxides of Ce, Pr, Nd, Pm, Sm, Eu, Gd, Tb, Dy, Ho, Er, Tu, Yb, Lu, and Sc, SiC and BN may be added singly or in combination.

As previously mentioned, a method of manufacturing a composite ceramic article according to this invention first comprises the step of molding the constituent members. Constituent members having a simple form are generally fabricated in a metal mold. However, any other astomery molding process may be applied. Constituent members of relatively complex shape are generally produced by injection molding, casting or machining. Of these processes, injection molding is most preferred from the industrial point of view. In this case, raw ceramic powder is mixed with an appropriate known organic binder such as polystyrene or polypropylene. The mixture is injected into a metal mold while being heated.

The moldings should be subjected to preliminary sintering. The reason is that when hot pressed, the moldings assembled into a prescribed shape without preliminary sintering tend to be readily broken or deformed. This tendency is particularly noticeable in an assembled block of a complex shape. With the method of this invention, therefore, preliminary sintering is effected at a temperature corresponding to 90 to 99%, or preferably 93 to 99%, of that level at which a hot press is operated in a final stage, and in such atmosphere as protects the assembly of moldings from oxidation. It is of course advisable to first determine the concrete conditions of the preliminary sintering such as temperature, atmosphere and time in consideration of the kind of raw ceramic material and the shape and size of constituent members prepared therefrom. Where the raw ceramic material consists of nitrides, a nitrogen atmosphere can generally be applied most effectively. Where the raw ceramic material consists of carbides, a nonoxidizing atmosphere such as $N_2$ or, Ar is preferred.

In any case, preliminarily sintered constituent members are preferred to have a density corresponding to more than 65% or preferably more than 70%, of the theoretical value. Such level of density enables the constituent members to withstand the pressure applied by a hot press and also attain good bonding. If the density falls below 65%, then the assembled block will display an uniform degree of shrinkage during hot pressing, failing to provide fully high dimensional precision. These difficulties become particularly prominent in composite ceramic articles of a complex shape.

Constituent members may be sintered simply by being placed in a mold. However, it is preferred to sinter the constituent members buried in powder packing in order to prevent the constituent members from being deformed during sintering or enabling the sintered constituent members to have a uniform density. The powder packing may consist of nonreactive heat-resistant powders, for example, of carbon, silicon carbide, silicon nitride, aluminium nitride and boron nitride or any combination thereof. Where raw ceramic material consists of silicon nitride, application of powders of aluminium nitride as packing gives rise to conversion from a noncrystalline to a crystalline phase in the preliminarily sintered constituent members, enabling the resultant composite ceramic article to have an improved mechanical strength at high temperature.

After being assembled into a predetermined form, the preliminarily sintered constituent members are hot pressed. This hot pressing process finally renders the assembled mass very compact with a density higher than 98% of the theoretical value. The hot pressing may be carried out in a mold, using separate powder as a pressure-transmitting medium. Application of the powdery pressure-transmitting medium is needed when a composite ceramic article of complex shape is manufactured. Boron nitride powder is most preferred as a pressure-transmitting medium. However, powders of SiC, $Si_3N_4$, TiN, $B_4C$ and any combination thereof may also be used for the same purpose. The best conditions for hot pressing are that at the start, a pressure of about 5 kg/cm$^2$ is applied; both pressure and temperature are gradually increased; and pressure is so controlled as to reach a final level when a hot press temperature rises to 90 to 100% of its final level. To describe in detail, a raw powder mixture formed of, for example 93% by weight of silicon nitride, 5% by weight of yttria, 2% by weight of alumina is preliminarily sintered according to the method of this invention to provide constituent members. When assembled into a prescribed form, the preliminarily sintered constituent members are hot pressed in the following manner. At the start, a pressure of about 5 kg/cm$^2$ is applied. Temperature is raised to 800° C. in 15 minutes and pressure is increased to 75 kg/cm$^2$. Later, pressure is elevated stepwise to 150 kg/cm$^2$ at 1600° C., 225 kg/cm$^2$ at 1650° C., 300 kg/cm$^2$ at 1700° C., 375 kg/cm$^2$ at 1750° C. and finaly 450 kg/cm$^2$ at 1780° C. Temperature is raised from 800° C. to 1780° C. in about 30 minutes, and the final pressure of 450 kg/cm$^2$ at 1780° C. is maintained for 2 hours. Later, pressure is immediately released and temperature is allowed to fall from the final level to 1300° C. in 15 minutes and then gradually drop to, for example, room temperature. After the heat source is shut off, the hot pressed assembled mass is allowed to cool in a hot press. The pressure and temperature applied in the above-mentioned hot pressing are appropriately selected in consideration of the kind of raw ceramic material used and the final shape and size of an assembled block.

The method of this invention for manufacturing a composite ceramic article has the following advantages:

(1) The constituent members are simply compounded, eliminating the necessity of installing a large scale plant even where an assembled block of large size is manufactured;

(2) Where one or more constituent members are undesirably chipped or broken during the molding-sintering process, the defective member or members are removed, and a commercially acceptable composite product can be provided simply by replacing the disqualified members with good spare ones, thereby minimizing the occurrence of the possibility that a final composite article as a whole is discarded as unacceptable;

(3) Since the product is a simply assembled block, a relatively short time is required for the preliminary sintering of the constituent members and also for the final sintering of an assembled block, offering economic advantages;

(4) Preliminarily sintered constituent members are prevented from deformation during hot pressing;

(5) Since the dimensional precision of constituent members can be examined during the intermediate steps of manufacture, a composite article can be easily produced with high dimensional precision; and (6) No foreign matter such as an adhesive is applied to the joints of the constituent members, enabling the resultant product to have as great a mechanical strength as the whole.

EXAMPLES OF THE INVENTION

The method of this invention for manufacturing a composite ceramic article will be more fully understood by reference to the examples which follow.

EXAMPLE 1

Figure 2:
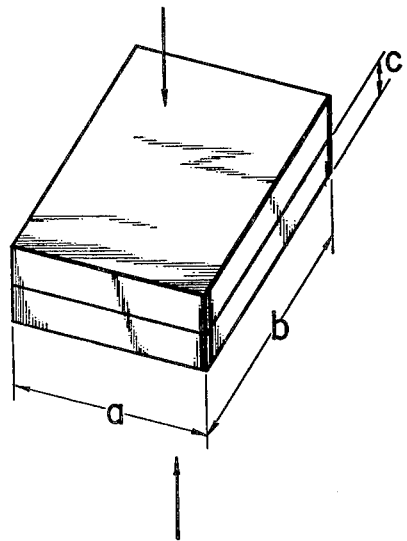
Figure 3:
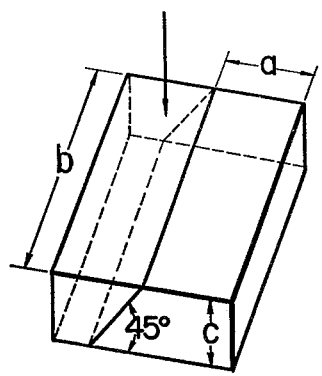
Figure 4:
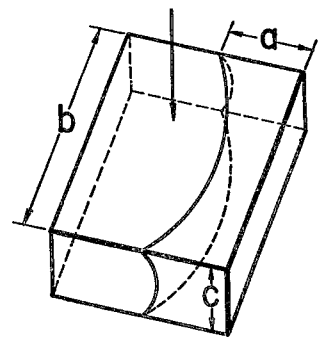
Figure 5:
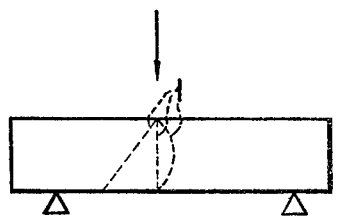
FIGS. 5 and 6 are the side elevations of the samples of FIGS. 1 to 4, showing the method of carrying out a breaking test on said samples.
Figure 6:
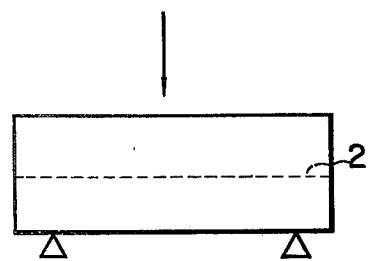

Three kinds of raw powdery ceramic material were provided, that is, a powder blend consisting of 93% by weight of silicon nitride, 5% by weight of yttria and 2% by weight of alumina (hereinafter referred to as "sample A"); a powder blend formed of 96.5% by weight of aluminium nitride, 0.5% by weight of $Y_2O_3$ and 3% by weight of $SiO_2$ (hereinafter referred to as "sample B") and a powder blend comprising 95% by weight of silicon carbide and 5% by weight of alumina (hereinafter referred to as "sample C"). Most of the above-mentioned powders had a smaller particle size than 1 micron. Each sample of powder blend was kneaded, using an organic binder, for example polystyrene, and fabricated into a square plate by cold molding. The respective moldings had the following three-dimensional forms. Namely, where hot press bonding was carried out parallel to the punching direction (vertical bonding) and almost parallel thereto (oblique or curved bonding), then a dimension "a" was 15 mm, a dimension "b" as 50 mm, and a dimension "c" was 10 mm as illustrated in FIGS. 1, 3 and 4. Where hot press bonding was effected at right angles to the punching direction (horizontal bonding), then the dimension "a" was 30 mm, the dimension "b" was 50 mm and the dimension "c" was 5 mm, as shown in FIG. 2. The punching direction in FIGS. 1 to 4 is indicated by arrows. The samples were treated under the conditions described in Table 1 below, providing preliminary sintered and simply molded materials with various degrees of density given opposite thereto.

Table 1

| No. of treating runs | Condition of treatment | Density after treated (comparison with the theoretical value) |
|---|---|---|
| 1 | No treatment | 51% |
| 2 | Heated 90 minutes at 1700° C. in packing of aluminium nitride powder | 65% |
| 3 | Heated 240 minutes at 1700° C. in packing of aluminium nitride powder | 70% |
| 4 | Heated 150 minutes at 1750° C. in packing of aluminium nitride powder | 75% |
| 5 | Heated 120 minutes at 1750° C. in packing of carbon powder | 65% |
| 6 | Heated 120 minutes at 1750° C. in packing of aluminium nitride | 70% |
| 7 | Heated 120 minutes at 1750° C. in packing of silicon carbide | 75% |

The same groups of two samples, one preliminarily sintered and the other simply molded, the same groups of two preliminarily sintered samples, and the same groups of two simply molded samples were hot press bonded for 120 minutes at a temperature of 1780° C. and a pressure of 350 kg/cm².

Composite bars for a breaking test were cut out of the hot press bonded blocks each measuring 3 mm×3 mm×25 mm and tested for mechanical strength. In the case of the vertical, oblique and curved bonding shown in FIGS. 1, 3 and 4, respectively, a breaking force was applied, as shown by an arrow parallel to or almost parallel to the bonded plane 1 of the composite bars. In the case of the horizontal bonding illustrated in FIG. 2, a flexural force was applied, as shown by an arrow, at right angles to the bonded plane 2 of the composite bars.

Table 2 below shows various combinations of simply molded samples and preliminarily sintered samples (represented by the numbers of the treating runs shown in Table 1); forms of bonding (as vertical oblique, curved and horizontal); density of hot pressed composite bars after hot pressing (comparison with the theoretical value); variations in the density of fully sintered composite bars; the flexural strength of tested pieces; and dimensional precision.

Table 2

| Test No. | | Kind of samples | Combination of treated samples | Form of bonding | Density of hot pressed samples | Variations to the density of fully blocks | Flexural strength (kg/mm²) | | | | | Dimensional precision |
|---|---|---|---|---|---|---|---|---|---|---|---|---|
| | | | | | | | RT | 800° C. | 1000° C. | 1200° C. | 1300° C. | |
| Control | 1 | A | 1—1 | Vertical | 99.0% | ± 1.0% | 90 | 81 | 64 | 51 | — | Deformed |
| " | 2 | A | 1—1 | Horizontal | 99.0% | ± 1.0% | 87 | 84 | 66 | 51 | — | Deformed |
| " | 3 | A | 1—1 | Oblique | 99.0% | ± 1.0% | 88 | 82 | 63 | 50 | — | Deformed |
| " | 4 | A | 1—1 | Curved | 99.0% | ± 1.0% | 88 | 81 | 63 | 50 | — | Deformed |
| Example | 1 | A | 3—3 | Vertical | 99.0% | ± 1.0% | 83 | 100 | 92 | 75 | 65 | Good |
| " | 2 | A | 3—3 | Horizontal | 100% | 0.5% | 107 | 101 | 96 | 80 | 70 | Good |
| " | 3 | A | 3—3 | Oblique | 99.9% | ± 0.6% | 85 | 100 | 93 | 76 | 66 | Good |
| " | 4 | A | 3—3 | Curved | 99.9% | ± 0.6% | 86 | 100 | 95 | 79 | 67 | Good |
| Control | 5 | A | 1-3 | Vertical | 99.1% | ± 4% | 74 | 78 | 47 | 49 | — | Deformed |
| " | 6 | A | 1-3 | Horizontal | 99.1% | ± 3.5% | 87 | — | — | 56 | 45 | Deformed |
| " | 7 | A | 1-3 | Oblique | 99.1% | ± 3.5% | 76 | 79 | 47 | 46 | — | Deformed |

Table 2-continued

| Test No. | Kind of samples | Combination of treated samples | Form of bonding | Density of hot pressed samples | Variations to the density of fully blocks | Flexural strength (kg/mm²) RT | 800° C. | 1000° C. | 1200° C. | 1300° C. | Dimensional precision |
| --- | --- | --- | --- | --- | --- | --- | --- | --- | --- | --- | --- |
| " 8 | A | 1–3 | Curved | 99.0% | ± 3.5% | 82 | 80 | — | 50 | — | Deformed |
| Example 5 | A | 2—2 | Vertical | 99.5% | ± 0.3% | 85 | 88 | 83 | 70 | 58 | Good |
| " 6 | A | 4—4 | Vertical | 99.8% | ± 0.1% | 100 | 103 | 97 | 82 | 77 | Good |
| " 7 | A | 5—5 | Vertical | 99.3% | ± 0.2% | 83 | 85 | 79 | 60 | 58 | Good |
| " 8 | B | 6—6 | Vertical | 99.8% | ± 0.2% | 78 | 65 | 60 | 51 | 40 | Good |
| " 9 | B | 6—6 | Horizontal | 99.8% | ± 0.3% | 80 | 70 | 62 | 50 | 40 | Good |
| " 10 | B | 6—6 | Oblique | 99.8% | ± 0.2% | 80 | 68 | 60 | 51 | 40 | Good |
| " 11 | B | 6—6 | Curved | 99.8% | ± 0.3% | 80 | 68 | 61 | 52 | 41 | Good |
| " 12 | C | 7—7 | Vertical | 99.3% | ± 0.2% | 81 | 70 | 65 | 60 | 55 | Good |
| " 13 | C | 7—7 | Horizontal | 99.3% | ± 0.2% | 80 | 73 | 66 | 63 | 56 | Good |
| " 14 | C | 7—7 | Oblique | 99.3% | ± 0.2% | 81 | 72 | 66 | 61 | 55 | Good |
| " 15 | C | 7—7 | Curved | 99.3% | ± 0.3% | 81 | 73 | 67 | 63 | 56 | Good |

The experiments whose results are given in Table 2 above demonstrate that the composite ceramic articles of this invention which are hot press bonded with powder packing used as a pressure-transmitting medium display substantially as high mechanical strength at a high temperature as a single solid hot pressed body. It has also been found that the joints of constituent members of a composite ceramic article according to this invention which were free from any foreign matter, for example, an adhesive, enabled the constituent members to be fully bonded and, as a consequence, a composite product to have a uniform density.

A combination of two simply molded samples (a test bar) represented by a test run No. 1 of Table 2 indeed had a greater mechanical strength than 50 kg/cm² at 1200° C. when hot press bonded. In many cases, however, the sample composite bar was readily broken or deformed during hot pressing and proved unacceptable for practical application.

The above-mentioned experiments clearly indicate that a composite ceramic article of this invention has its mechanical strength only slightly affected by the form of hot press bonding, that is, whether the article is bonded in a vertical, horizontal or oblique direction relative to the direction in which a hot press exerts pressure. Therefore, the composite ceramic article of the invention provides little problem in respect of mechanical strength, even when the constituent members are assembled in any direction admitting of easy fabrication.

EXAMPLE 2

Figure 8:
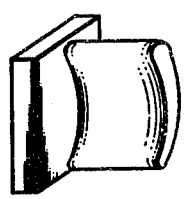
FIG. 8 is an oblique view of a molded blade of the turbine rotor of FIG. 7.
Figure 9:
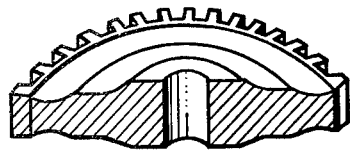
FIG. 9 is an oblique view of a hub portion of the turbine rotor of FIG. 7.

Silicon nitride was mixed with 5% by weight of yttria and 2% by weight of alumina. The whole mixture was pulverized to a particle size smaller than 1 micron. The powder mixture was kneaded with a binder. The mass was injection molded into a plurality of blades as shown in FIG. 8. On the other hand, a hub illustrated in FIG. 9 was cold fabricated in a metal mold. The molding was degreased at 400° C. Part of the degreased molding was kept intact. The other portion was preliminarily sintered for 240 minutes at a temperature of 1700° C. to 1750° C. in packing a of aluminum nitride powder. The treated samples presented physical conditions given in Table 3 below.

Table 3

| Sample No. | Shape | Treated condition | Density (ratio to the theoretical value) |
| --- | --- | --- | --- |
| 1 | Blade | Just as molded | 50% |
| 2 | Blade | Preliminarily sintered | 60% |
| 3 | Blade | " | 65% |

Table 3-continued

| Sample No. | Shape | Treated condition | Density (ratio to the theoretical value) |
| --- | --- | --- | --- |
| 4 | Blade | " | 72% |
| 5 | Hub | Just as molded | 50% |
| 6 | Hub | Preliminarily sintered | 61% |
| 7 | Hub | " | 65% |
| 8 | Hub | " | 70% |

Figure 7:
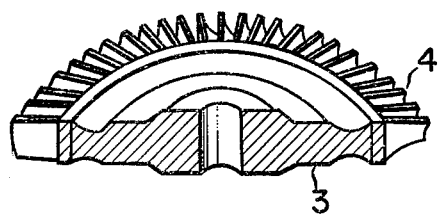
FIG. 7 is an oblique view of a turbine rotor embodying the invention.

Grooves were cut out in the entire periphery of the hub in a number equal to that of the blades being attached. In this case, blades bearing the numbers of 1 to 4 and hubs represented by the numbers of 5 to 8 were respectively fitted together. Each combination of the blades and hubs was hot pressed 150 minutes at 1780° C. and pressure of 350 kg/cm² with packing of boron nitride powder used as a pressure-transmitting medium to provide a turbine rotor shown in FIG. 7. The extent of chipping and breakage occurring in the combinations of the blades and hubs indicated by the number of FIG. 3 during hot pressing and the dimensional precision of said combinations are set forth in Table 4 below.

Table 4

| Combination No. | Constituents | Extent of chipping and breakage | Dimensional precision |
| --- | --- | --- | --- |
| A | 1-5 | Extremely noticeable | Very low |
| B | 2-6 | Slightly noticeable | Low |
| C | 3-7 | Not noticeable at all | High |
| D | 4-8 | Not noticeable at all | Very high |
| E | 2-8 | Slightly noticeable | Low in the wing |
| F | 4-6 | Slightly noticeable | Low in the hub |

The composite ceramic turbine rotors fabricated from the combinations C and D of Table 4 were fully integrated, had a uniform density corresponding to more than 98% of the theoretical value and displayed a flexural strength greater than 50 kg/cm² at 1200° C. The combination A obtained by hot pressing a low density molding not subjected to preliminary sintering showed a relatively small flexural strength of about 50 kg/cm², and prominent occurrence of chipping and breakage. The constituent members of the combination A were unsuccessfully bonded, causing the resultant composite turbine rotor to have a very low dimensional precision. The combination B of constituent members whose density after preliminary sintering indicated less than 65% caused the resultant turbine rotor to have a low dimensional precision, though the rotor did not display so small a flexural strength on the combination A. The combination C showed satisfactory flexural strength and dimensional precision and was free from chipping or breakage. The combination D was superior to the combination C in all respects. The combinations E and F, one constituent of which indicated, after preliminarily sintering, a lower density than 65% of the theoretical value, presented a low dimensional precision in the low density portion and was found inferior to the combinations C and D.

The foregoing description refers to the case where blades were fabricated separately and fitted to a hub. However, it is possible to previously provide an integral assembly of blades and fit the assembly into the hub, or to divide the hub itself into portions.

It is found effective for improved acid proofness of the blades to apply acidproof material on the surface of the blades or construct the blades of prominently acidproof material.

It is seen from the foregoing description that the composite ceramic article of this invention which is fully integrated and does not contain any foreign matter, for example an adhesive, at the joints of the constituent members, avoids accidents or difficulties which might otherwise take place at the joints; is free from problems attributable to ununiform density, for example, limitations in application; has a mechanical strength greater than 50 kg/cm$^2$ at 1200° C.; and presents a density higher than 98% of the theoretical value. Therefore, the composite ceramic article of this invention is well adapted for use as a turbine rotor of complicated shape which is exposed to high temperature during use, and moreover is easy to manufacture. Obviously, this in variation is not exclusively applied to production of a large article.

What we claim is:

1. A method for manufacturing a strong, fully integrated composite ceramic article having a complex shape which comprises the steps of:
   (a) molding raw ceramic powder into a plurality of constituent members which fit together to form said shape;
   (b) preliminarily sintering each of the constituent members until separate moldings each have a density greater than 70% of the theoretical density but less than the density of the resulting composite article are produced;
   (c) assembling each of the preliminarily sintered moldings of step (b) into a block in the form of said shape; and
   (d) hot pressing the thus assembled block under uniform pressure in a powder packing pressure-transmitting medium, integrally bonding the preliminarily sintered constituent members directly to each other, the thus bonded block having density greater than 98% of the theoretical density through each of said constituent members forming said block.

2. A method of manufacturing a composite ceramic article according to claim 1, wherein the powder packing used as a pressure-transmitting medium is selected from the group consisting of boron nitride powder and carbon powder.

3. A method of manufacturing a composite ceramic article according to claim 1, wherein the preliminary sintering process is carried out by burying the molding in powder packing.

4. A method of manufacturing a composite ceramic article according to claim 3, wherein the powder used as packing is powder of at least one material selected from the group consisting of carbon, silicon carbide, silicon nitride, aluminium nitride, and boron nitride.

5. A method of manufacturing a composite ceramic article according to claim 1, wherein the composite ceramic article is a turbine rotor; and the blades and hub of said turbine rotor are separately molded in advance and, after preliminary sintering, integrally assembled.

6. A method of manufacturing a composite ceramic article according to claim 1, wherein the raw ceramic powder consists of more than 70% by weight of ceramic material selected from the group consisting of silicon nitride, aluminum nitride and silicon carbide.

7. A method of manufacturing a composite ceramic article according to claim 6, wherein the raw ceramic powder is formed of more than 65% by weight of silicon nitride, less than 30% by weight of yttria and less than 5% by weight of alumina.

8. A method of manufacturing a composite ceramic article according to claim 1 wherein the theoretical density of the preliminarily sintered constituent member is in the range of 70% to about 75%.

9. A method of manufacturing a strong, fully integrated composite ceramic article having a complex shape, said process comprising the steps of:
   (a) molding a raw ceramic powder into a plurality of separate constituent members of a predetermined shape, and ceramic material selected from the group consisting of silicon nitride, aluminum nitride and silicon carbide;
   (b) preliminarily sintering each of the constituent members until separate moldings each having a density greater than 70% of the theoretical density but less than the density of the resulting composite article are produced;
   (c) assembling each of the preliminarily sintered moldings of step (b) into a block having a predetermined shape; and
   (d) hot pressing the thus assembled block in a powder packing pressure-transmitting medium under conditions of continuously increasing heat and pressure, integrally bonding each of the preliminarily sintered constituent members directly to each other at their points of attachment, and continuing said hot pressing until a density greater than 98% of the theoretical density is obtained and the variation of density within the resulting article is within ±5%.

10. A method of manufacturing a strong, fully integrated composite ceramic article having a complex shape, said process comprising the steps of:
    (a) molding a raw ceramic powder into a plurality of separate constituent members of a predetermined shape, and ceramic material selected from the group consisting of silicon nitride, aluminum nitride and silicon carbide;
    (b) preliminarily sintering each of the constituent members until separate moldings each having a density of at least 65% and up to 75% of the theoretical density are produced;
    (c) assembling each of the preliminarily sintered moldings of step (b) into a block having a predetermined shape; and
    (d) hot pressing the thus assembled block in a powder packing pressure-transmitting medium under conditions of continuously increasing heat and pressure, integrally bonding each of the preliminarily sintered constituent members directly to each other at their points of attachment, and continuing said hot pressing until a density greater than 98% of the theoretical density is obtained and the variation of density within the resulting article is within ±5%.

* * * * *